US006990470B2

(12) United States Patent
Hogan et al.

(10) Patent No.: US 6,990,470 B2
(45) Date of Patent: Jan. 24, 2006

(54) METHOD AND SYSTEM FOR CONDUCTING SECURE PAYMENTS OVER A COMPUTER NETWORK

(75) Inventors: Edward J. Hogan, Larchmont, NY (US); Carl M. Campbell, Newtown Square, PA (US)

(73) Assignee: MasterCard International Incorporated, Purchase, NY (US)

( * ) Notice: Subject to any disclaimer, the term of this patent is extended or adjusted under 35 U.S.C. 154(b) by 585 days.

(21) Appl. No.: 09/886,485

(22) Filed: Jun. 22, 2001

(65) Prior Publication Data

US 2002/0116341 A1 Aug. 22, 2002

Related U.S. Application Data

(63) Continuation-in-part of application No. 09/833,049, filed on Apr. 11, 2001, and a continuation-in-part of application No. 09/809,367, filed on Mar. 15, 2001.
(60) Provisional application No. 60/226,227, filed on Aug. 18, 2000, provisional application No. 60/213,063, filed on Jun. 21, 2000, and provisional application No. 60/195,963, filed on Apr. 11, 2000.

(51) Int. Cl.
*G06F 17/60* (2006.01)

(52) U.S. Cl. .......................... 705/64; 705/65; 705/67; 705/71; 705/74; 705/75; 705/76; 713/150; 380/277

(58) Field of Classification Search ............. 705/64–79; 713/150; 380/277
See application file for complete search history.

(56) References Cited

U.S. PATENT DOCUMENTS 5,317,636 A    5/1994   Vizcaino .................... 380/23

(Continued)

FOREIGN PATENT DOCUMENTS

EP    1 028 401    8/2000

(Continued)

OTHER PUBLICATIONS

Prenell et al., "On the Security if Iterated Message Authentication Codes", 1999, IEEE.*

*Primary Examiner*—James P. Tramwell
*Assistant Examiner*—Jalatee Worjtoh
(74) *Attorney, Agent, or Firm*—Baker Botts LLP

(57) ABSTRACT

A secure method of conducting an electronic transaction over a public communications network is provided which utilizes a pseudo-expiration date in the expiration date field of an authorization request. One of the preferred methods comprises:

generating a per-card key associated with an account number;
generating a message authentication code using the per-card key;
converting the message authentication code into a pseudo expiration date;
generating an authorization request for the transaction, the request having an expiration date field containing the pseudo expiration date; and
verifying the message authentication code based on the pseudo expiration date.

Another embodiment of the invention includes a method of conducting an electronic transaction over a public communications network, with a payment account number having an associated pseudo account number, comprising:

(a) providing the pseudo account number with a control field indicating one of a plurality of key-generation processes to be used to generate an authentication key;
(b) generating an authentication key associated with the pseudo account number using one of the plurality of key-generation processes indicated in the control field of the pseudo account number;
(c) using the authentication key to generate a message authentication code specific to the transaction;
(d) generating an authorization request message including the message authentication code and the pseudo account number; and
(e) verifying the message authentication code using the indicated key-generation process and the authentication key.

14 Claims, 6 Drawing Sheets

U.S. PATENT DOCUMENTS

| | | | |
|---|---|---|---|
| 5,761,306 A | 6/1998 | Lewis | 380/21 |
| 5,790,677 A | 8/1998 | Fox et al. | 380/24 |
| 5,883,810 A | 3/1999 | Franklin et al. | |
| 5,903,878 A | 5/1999 | Talati et al. | 705/26 |
| 5,956,699 A | 9/1999 | Wong et al. | |
| 5,991,412 A * | 11/1999 | Wissenburgh et al. | 705/67 |
| 6,000,832 A * | 12/1999 | Franklin et al. | 700/232 |
| 6,072,870 A | 6/2000 | Nguyen et al. | 380/24 |
| 6,227,447 B1 | 5/2001 | Campisano | 235/380 |
| 6,370,514 B1 | 4/2002 | Messner | 705/14 |
| 2001/0034720 A1 | 10/2001 | Armes | 705/65 |
| 2001/0037451 A1 | 11/2001 | Bhagavatula et al. | 713/155 |
| 2001/0047281 A1 | 11/2001 | Keresman, III et al. | 705/2 |
| 2001/0047335 A1 | 11/2001 | Arndt et al. | 705/44 |
| 2001/0051902 A1 | 12/2001 | Messner | 705/26 |
| 2002/0032663 A1 | 3/2002 | Messner | 705/72 |
| 2002/0046169 A1 | 4/2002 | Keresman, III et al. | 705/41 |
| 2002/0052784 A1 | 5/2002 | Sherwin et al. | 705/14 |
| 2003/0120615 A1 * | 6/2003 | Kuo | 705/78 |

FOREIGN PATENT DOCUMENTS

| | | |
|---|---|---|
| WO | WO9966428 * | 12/1999 |
| WO | WO 01/01622 A2 | 1/2001 |
| WO | WO 01/07873 A2 | 2/2001 |
| WO | WO 01/26062 A1 | 4/2001 |
| WO | WO 01/67215 A2 | 9/2001 |
| WO | WO 01/84509 A2 | 11/2001 |
| WO | WO 02/15077 A1 | 2/2002 |

\* cited by examiner

| 16 digit pseudo acct # | 4 decimal digit exp. date | 4 bit SPA version # | value of 20 bit model TSN | 16 bit MAC |
|---|---|---|---|---|

SPA Request to SP

FIG. 2

METHOD AND SYSTEM FOR CONDUCTING SECURE PAYMENTS OVER A COMPUTER NETWORK

This application claims priority to United States provisional application 60/226,227, filed on Aug. 18, 2000, and entitled "Method and System for Conducting Secure MasterCard Payments Over a Computer Network", which is hereby incorporated by reference, and to provisional application 60/213,063, filed on Jun. 21, 2000, entitled "An Improved Method and System for Conducting Secure Payments Over a Computer Network", which is also hereby incorporated by reference. This application is a Continuation-in Part of U.S. application Ser. No. 09/809,367, filed Mar. 15, 2001, entitled "Method and System for Secure Payments Over a Computer Network" and is a Continuation-in Part of U.S. application Ser. No. 09/833,049, filed on Apr. 11, 2001, entitled "An Improved Method and System for Conducting Secure Payments Over a Computer Network", which is hereby incorporated by reference, and which itself claims priority to United States provisional application 60/195,963, filed on Apr. 11, 2000, and entitled "Method and System for Conducting Secure Payments Over a Computer Network."

BACKGROUND OF INVENTION

This invention relates to a method and system for conducting secure financial transactions over a communications network and more particularly to a method and system for transmitting payments securely over a computer network, such as the Internet, and for transmitting sensitive information securely over public communication channels.

As is self-evident, on-line commerce has experienced tremendous growth over the last few years but even with that growth consumers are still troubled and concerned about using personal financial information and transmitting such information, such as credit card numbers and personal identification numbers, over public communications networks, such as the Internet. As a result, over the last few years, companies have struggled to find a way—the best way—to ensure the security of payments made over a computer network and to decrease the risk of theft or misuse of financial information.

For example, U.S. Pat. No. 5,883,810 entitled "Electronic Online Commerce Card With Transaction Proxy Number For Online Transactions" and assigned to Microsoft Corporation, is directed to a system which provides for each transaction a temporary transaction number and associates it with the permanent account number; the transaction number looks like a real credit card number and the customer uses that transaction number and submits it to the merchant as a proxy for the customer account number. In this matter, the customer does not have to transmit over a public network his or her real credit card number.

In the '810 patent, the merchant passes along the transaction number to the issuing institution, which in turn uses the transaction number as an index, accesses the real customer account number and processes the authorization, sending the authorization reply back to the merchant under the transaction number. As a result, risk is purportedly minimized not only because the customer only transmits a transaction number but also because the proxy number is good only for a single purchase—theft "would not greatly benefit a thief because it cannot be repeatedly used for other purchases or transactions." Col. 2, lines 60–61.

There is a need to improve upon the prior art systems and in particular there is a need for a method and system for conducting a secure financial transaction over the Internet which avoids requiring the creation and transmission of a unique repeatedly-generated transaction number to replace the transmission of the permanent account number for each conducted transaction.

According to the invention of co-pending application Ser. No. 09/809,367, filed Mar. 15, 2001, which is incorporated herein by reference, a "pseudo" account number is assigned to a customer and cryptographically linked to a consumer's payment account number. The payment account number is an account number issued by a financial institution or other organization that a consumer may use to make a payment for goods and/or services. For example, the payment account number may be the account number from a payment card, such as a credit or debit card, or from a payment application, such as an electronic cash application stored on a consumer's computer. The pseudo account number appears to be an actual payment account number to a merchant. That is, the pseudo account number has the same length as a valid payment account number and begins with a valid identification number (e.g., a "5" for MasterCard International Incorporated ("MasterCard")). The pseudo account number is used by the customer instead of the real account number for all of his or her on-line financial transactions.

According to the invention of the co-pending application Ser. No. 09/809,367, all transactions based on pseudo account numbers are preferably cryptographically authenticated using a secret key that is unique for each account number. The authentication may be based on the private key of a public-key pair ("public-key authentication"), or based on a secret key other than a private key ("secret-key authentication"). Thus, if unauthorized persons were to ascertain any pseudo account numbers, they would be unable to make fraudulent transactions using them.

In addition, according to the invention of co-pending Ser. No. 09/833,049, a method of conducting a transaction using a payment network is provided, in which a service provider is assigned an acquirer code. More specifically, the service provider receives a first authorization request for the authorization of a transaction using a first payment account number, wherein:

(i) the first payment account number has a BIN code associated with the service provider, and is associated with a second payment account number having a BIN code associated with an issuer of said second number;

(ii) the first authorization request includes an acquirer code associated with an acquirer; and (iii) the first authorization request is routable through the payment network to the service provider based on the BIN code of the first payment account number.

The method further includes having the service provider respond to the first authorization request by transmitting a second authorization request for authorization of the transaction using the second payment account number, the second authorization request including an acquirer code associated with the service provider and being routable through the payment network to the issuer based on the issuer's BIN code (i.e., the BIN code of the second payment account number).

Additionally, a response to the second authorization request is received by the service provider from the issuer, where the response includes the acquirer code associated with the service provider and is routable through the payment network based on that code. A response to the first authorization request is then transmitted by the service provider to the acquirer based on the response to the second authorization request, and the response to the first authorization request preferably includes the acquirer code associated with the acquirer and is routable through the payment network based on that code.

In another preferred embodiment of the invention of co-pending Ser. No. 09/833,049, a method is provided of conducting a transaction with a merchant using a first payment account number that is associated with a second payment account number, where the method comprises: (a) generating a message authentication code based on one or more transaction details; (b) transmitting at least the first payment account number and the message authentication code to the merchant; (c) requesting by the merchant an authorization for payment of the transaction using the first payment account number, the request being formatted as if payment were tendered at a point-of-sale terminal with a conventional magnetic-stripe payment card, the message authentication code being transmitted in a discretionary data field contained in a track of the type used in the magnetic stripe of the conventional payment card; (d) responding to the authorization request for the first payment account number by requesting an authorization for payment of the transaction using the associated second payment account number; and (e) accepting or declining the authorization request for the first payment account number based on the response to the authorization request for the second payment account number and the message authentication code.

This system can still be improved upon and security and efficiency can be further enhanced to protect the messages and information being transmitted during or in connection with a financial transaction being conducted over public communications lines.

SUMMARY OF INVENTION

According to the present invention, therefore, a method is provided for conducting an electronic transaction over a public communications network with an account number using a pseudo expiration date. The preferred method comprises:

generating a per-card key associated with an account number;

generating a message authentication code using the per-card key;

converting the message authentication code into a pseudo expiration date;

generating an authorization request for the transaction, the request having an expiration date field containing the pseudo expiration date; and verifying the message authentication code based on the pseudo expiration date.

The preferred method further includes a payment network including an issuer of the account number with a real expiration date, where a second authorization request is generated including the real expiration date and the second request is forwarded to the issuer for approval of the transaction.

A more detailed embodiment of the present invention includes a payment account number having an associated pseudo account number, and the following steps:

(a) generating by a service provider a per-card key associated with the pseudo account number using the payment account number and the pseudo account number;

(b) creating a secure payment application for use in the transaction including said per-card key;

(c) using the per-card key to generate a message authentication code ("MAC");

(d) generating a MAC verification request by the secure payment application including the pseudo account number and the MAC;

(e) verifying the MAC;

(f) based on the verification, creating an expected transaction sequence number (ETSN) for the MAC;

(g) providing the secure payment application with reference data;

(h) creating a second message authentication code using the expected transaction sequence number and the per-card key;

(i) converting the second message authentication code into a pseudo expiration date using the reference data;

(j) generating an authorization request having an expiration date field containing the pseudo expiration date; and (k) responding to the authorization request and verifying the second message authentication code based on the pseudo expiration date.

In accordance with another embodiment of the present invention a method is provided of conducting an electronic transaction over a public communications network, with a payment account number having an associated pseudo account number, comprising:

(a) providing the pseudo account number with a control field indicating one of a plurality of key-generation processes to be used to generate an authentication key;

(b) generating an authentication key associated with the pseudo account number using one of the plurality of key-generation processes indicated in the control field of the pseudo account number;

(c) using the authentication key to generate a message authentication code specific to the transaction;

(d) generating an authorization request message including the message authentication code and the pseudo account number; and (e) verifying the message authentication code using the indicated key-generation process and the authentication key.

In accordance with yet another embodiment of the present invention, a method is provided of conducting an electronic transaction over a communications network with an account number, comprising:

generating a per-card key associated with the account number;

generating a message authentication code using the per-card key providing at least two different operating modes for forwarding in different manners the message authentication code with an authorization request having different fields, at least one of the operating modes for forwarding the message authentication code in an expiration date field and at least one of the operating modes for forwarding the message authentication code in a message authentication code field. Preferably, the message authentication code is automatically conveyed in the message authentication code field if the message authentication code field exists.

BRIEF DESCRIPTION OF THE DRAWINGS

Further objects, features and advantages of the invention will become apparent from the following detailed description taken in conjunction with the accompanying figures showing a preferred embodiment of the invention, of which:

FIG. 2 is a representation of information provided within an initial secure payment application request in accordance with one embodiment of the present invention;

Figure 1:
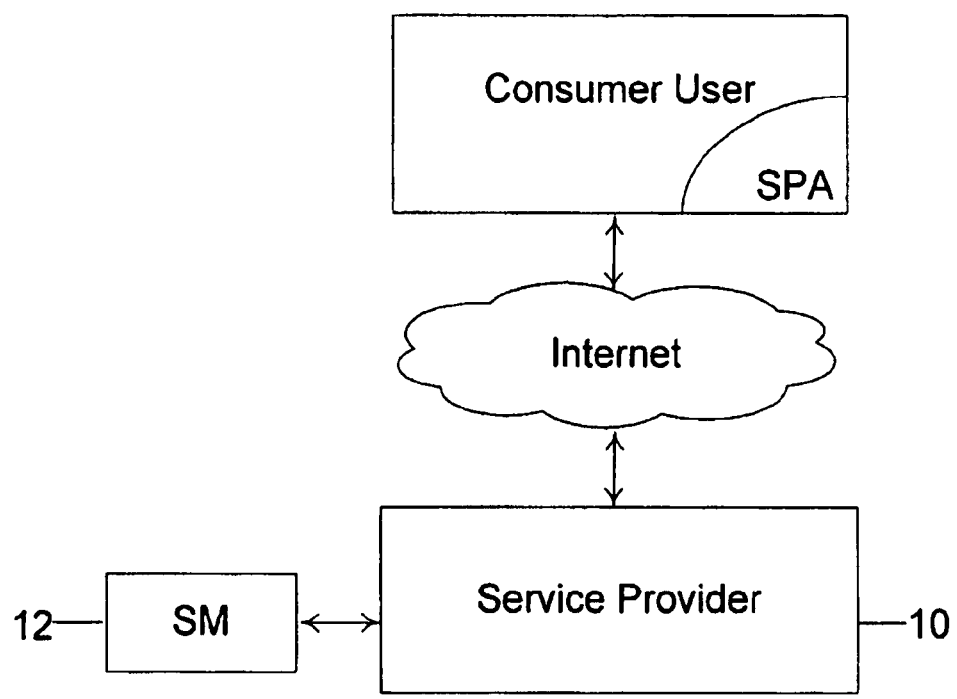
FIG. 1 is a block diagram of certain processing components involved in the transaction method in accordance with one embodiment of the invention.

Throughout the figures, the same reference numerals and characters, unless otherwise stated, are used to denote like features, elements, components or portions of the illustrated embodiment. Moreover, while the subject invention will now be described in detail with reference to the figures, it is done so in connection with a preferred embodiment. It is intended that changes and modifications can be made to the described embodiment without departing from the true scope and spirit of the subject invention as defined by the appended claims.

DETAILED DESCRIPTION OF THE PREFERRED EMBODIMENT

The present invention is directed to a method and system for conducting secure payments over a computer network, such as the Internet. The present invention utilizes "pseudo" account numbers in place of "real" account numbers (i.e., the actual card payment account number issued by an issuing institution) as disclosed in co-pending application Ser. No. 09/809,367.

Advantageously, the present invention provides enhanced security for the use of payment account numbers over the Internet. With the present invention, if pseudo account numbers are stolen, these stolen pseudo account numbers may not, under most circumstances, feasibly be used to conduct fraudulent transactions over the Internet because transactions based on pseudo account numbers are cryptographically authenticated using a secret key that is unique for each account number. This secret key is located only within a cardholder's secure payment application ("SPA") and within highly-secure equipment at a service provider's facilities, and by way of example only throughout this specification at the facilities of MasterCard International Incorporated ("MasterCard"). Furthermore, a pseudo account number does not disclose a cardholder's real account number, and would likely be rejected at conventional point-of-sale (POS) terminals.

Attached are a number of figures that illustrate exemplary embodiments of the present invention. In the attached figures and the following description, MasterCard is used to indicate the entity that provides and processes pseudo account numbers. The relevant acronyms which may be used herein are:

| | |
|---|---|
| BIN | Bank Identification Number |
| DEA | Data Encryption Algorithm |
| PC | A Consumer's personal computer device |
| MAC | Message Authentication Code |
| MCI | MasterCard International or MasterCard |

-continued

| | |
|---|---|
| MCWS | MasterCard Website |
| PIN | Personal Identification Number |
| POS | Point of Sale |
| SPA | Secure Payment Application |
| SSL | Secure Socket Layer (for Internet security) |
| TSN | Transaction Sequence Number |

In accordance with a preferred embodiment of the invention, a service provider issues, maintains and/or processes several components, including a secure payment application ("SPA"), of the secure payment system to be conducted in accordance with the techniques of the present invention.

SPA System Components

Preferably, the SPA system is transparent to existing payment processing (e.g., MasterCard) operations and can be transparent to existing merchant, acquirer, and issuer operations. It preferably utilizes three stand-alone components:

1. One or more SPA websites
2. SPA wallets for cardholder PCs (or other Internet access devices)
3. SPA Authorization/Clearing Systems Briefly, the SPA websites are used to "register" new cardholders, and are also used, in Mode-1 (defined below), to provide data to the appropriate SPA authorization/clearing system that it must receive before processing an authorization-request message.

A SPA wallet is software that is downloaded to a PC (or the like) to be used in SPA transactions. It is invoked by the cardholder's clicking on an icon. Once invoked, it uses a combination of software and data customized to a given card to perform Internet payments in a secure manner.

SPA authorization/clearing systems are physical computer systems, one such system serving one or more issuers, that process SPA transactions and convert them to (and in some cases from) conventional transactions.

The SPA website and/or SPA authorization clearing system are also referred to herein as and/or associated with one or more service providers.

SPA Modes

Four SPA modes of operation are preferably supported by the system. These modes are:

Mode 0: No authentication

Mode 1: Authentication using the expiration-date field

Modes 2 and 3: Authentication using a new field dedicated to SPA

Advantageously, modes 0 and 1 require no change to existing merchant or acquirer processing. Modes 2 and 3 require that the merchant add a new field to its payment screen preferably a hidden field not displayed for the cardholder but discernable to the SPA software in the cardholder's PC) and, when this field is filled out by the PC, that the merchant pass this field (unchanged) to the acquirer, which, in turn, passes it (unchanged) to a payment system for approval. This may be the same field that, in other systems, is used to convey ICC-related data.

Mode 2 also requires that, if the merchant ever sends a second authorization-request message as a result of one transaction with a cardholder, that this second (and any subsequent) authorization-request message not have an expiration-date field. Such subsequent authorization-request messages are considered as mail-order-telephone-order transactions and are not guaranteed.

Mode 3 is identical to Mode 2 except that Mode 3 does not impose the above requirement that the merchant never send a subsequent authorization-request message with an expiration date. In Mode 3 it makes no difference whether such a subsequent authorization-request message has, or does not have, an expiration date.

Since Mode-2 imposes restrictions that Mode-3 does not, the identifier of the "hidden field" for Mode-2 use must convey the fact that (1) the hidden field, usable as the SPA MAC field, exists, and (2) the merchant will never submit a subsequent authorization-request message with an expiration-date field. The "hidden field" usable for Mode-3 does not have this second restriction, and therefore has a different identifier.

It should be noted that the field suitable for Mode-3 use can be a "universal" field accepted by all payment systems for electronic-commerce use (e.g., for ICCs used in electronic commerce). However, Mode-2 cannot use such a "universal" field, since it can be used only when the merchant "guarantees" that it will never include an expiration date in a subsequent authorization-request message. Therefore Mode-2 can be used only with those merchants that have made special provision to accept a SPA transaction, whereas Mode-3 can be used with any merchant that provides an additional field in electronic-commerce transactions for use by all payment systems.

Mode 2 or 3 is preferable to Mode 0 or 1 in that the former provides more effective authentication. SPA preferably operates in Mode 0 or 1 unless it discerns that the merchant supports Mode 2 or 3 by the existence of the indicated "hidden field" in the merchant's payment screen. SPA in the cardholder's PC always operates in Mode 2 or 3 when the merchant supports this mode.

Preferably, the cardholder's PC operates in one of three, states, "State A", "State B", or "State C." When in "State A" the PC operates in Mode 1 or Mode 2 (depending upon the merchant's capabilities), but never in Mode 0 or Mode 3. When in "State B" the PC operates in Mode-1, Mode-2 or Mode-3 (again depending upon the merchant), but never in Mode 0. When in "State C" the PC operates (depending upon the merchant's capabilities) in Mode 0, Mode 2 or Mode 3, but never in Mode 1. The PC, upon instructions from the SPA website, preferably can switch between states.

"State A" has the advantage that all transactions have some degree of authentication. "State B" somewhat lessens the authentication offered by Mode-1 but has the advantage that transactions from all merchants that accept the "universal" additional field have a substantially higher degree of authentication. "State C" is intended for future use, when most major merchants provide for the "universal" additional field, and considerably lessens the storage requirements imposed on the SPA Authorization System, but at the cost of no authentication for those merchant that do not provide for this "universal" additional field. Thus, if and when more-and-more merchants can accept the "universal" additional field, but cannot accept the SPA-unique Mode-2 additional field, it might be appropriate for an issuer to make a transition from "State A" to "State B" and ultimately to "State C" for its SPA wallets. The transition from one state to another preferably is an issuer option, and wallets from different issuers (even if present on the same PC) can be in different states.

SPA Characteristics

As stated above, SPA is based on the use of pseudo account numbers rather than the "real" account numbers that appear on cardholders' cards. There is a one-to-one correspondence between a pseudo account number and the corresponding "real" account number. The same pseudo account number is used by SPA for all modes.

The BIN of a pseudo account number is a "pseudo BIN" that is not embossed on any MasterCard card. There is one pseudo BIN per card issuer, so that the issuer of a pseudo account number can be identified. The use of a pseudo BIN identifies the account number of a given transaction as a pseudo account number. All merchants and acquirers know the cardholder by the pseudo account number, but the issuer knows the cardholder by the "real" account number. Thus one of the functions of the SPA system, as described in the co-pending applications, is to "translate" between the two numbers.

In accordance with the present invention, another function of the SPA system is to verify the Message Authentication Code ("MAC") that accompanies every SPA Mode-1, Mode-2, or Mode-3 authorization request. In the case of Mode 1, the present invention provides that the MAC takes the form of a pseudo expiration date, and the data to be authenticated preferably is conveyed via the SPA website for every Mode-1 transaction. In the case of Modes 2 or 3, the MAC is a portion of the "MAC Field", the new SPA-field added to all Mode-2/3 transactions. The data to be authenticated is also included in the MAC field.

The same SPA can have copies on different PCs. Any one PC can have SPA wallets for a number of different cards, where these wallets can be controlled by and used by different cardholders.

SPA Web-Site Operation: Card Registration

When the cardholder at a PC wishes to register a given card for SPA, he/she uses the PC's browser to contact the SPA website. (A web-access device that is not a PC operates in a similar manner to that described here.) SSL encryption should be used for all data transmitted between the PC and the SPA website. When the website senses that it is being contacted by a browser, and not by an already-loaded SPA application, it preferably operates as follows.

It first sends to the PC an initial screen that asks for either the "real" account number or, if the cardholder has already registered this card on some (other) PC, the pseudo account number. Once the SPA website has received this information, it examines the BIN. It holds a list of all issued pseudo BINS, and the SPA website first determines whether or not the BIN of the given account number is on this list. If so, it is a pseudo account number and if not it is a "real" account number.

If the BIN represents a "real" BIN, the SPA website determines if the issuer participates in SPA. It does this by holding a second table that relates "real" BINS to pseudo BINS, and, if it finds an entry in this table for the "real" BIN in question, it knows that this issuer participates in SPA. If the BIN is a pseudo BIN, the SPA website knows, from that fact alone, that this is a pseudo account number and that the issuer is a SPA participant. In either of these two situations, the SPA website knows that a SPA wallet may be able to be provided for this card. If the issuer does not participate in SPA, the SPA website preferably sends a message to the cardholder informing him/her that a SPA wallet is not available at this time.

If the SPA website determines that the card issuer supports SPA, then the SPA website sends a second screen that preferably asks for:

1. The card's expiration date
2. The cardholder's name, address and phone number
3. Whether or not the cardholder is at a PC that he/she owns/controls
4. If a "real" account number, not a pseudo account number, was provided in the first step, whether or not the cardholder has previously registered this card for SPA
5. If the card has been previously registered for SPA (indicated by a "yes" to the preceding, or by the use of a pseudo account number), whether or not the cardholder remembers the password selected during that registration
6. The already-select password if this card has been previously registered for SPA and the cardholder remembers this password (the cardholder was asked question #4 and answered "yes")

Question #5 is always included when the cardholder entered a pseudo account number on the first screen, but question #4 is not asked. Otherwise question #4 is asked, and question #5 is added if the cardholder answers "yes" to this question. Item #6 is added if question #5 is asked and is answered "yes".

If this is the first registration for this account number, or the cardholder does not remember the password from the previous registration, then the SPA website sends a third screen with issuer-unique authenticating questions to the PC, asking for information such as (1) a "SPA registration code" that the cardholder received by mail, (2) the CVC2 as printed on the back of the card, (3) the cardholder's social-security number (or a portion of the number), (4) the cardholder's mother's maiden name. The contents of this third screen are preferably determined by the issuer, and present a request for the authenticating information that this issuer has selected. This third screen also provides a place where the cardholder must enter a password that he/she must use, in the future, to activate SPA, or may use, in the future, to request a copy of SPA for a different PC, assuming that the issuance of the now-being-requested SPA wallet is approved by the card issuer. Note that, if a SPA already exists for this account number, this password will replace the previous password for purposes of initiating a new SPA copy. Also note that if a husband and wife, for example, share the same account number they will share the same pseudo account number and thus must use the same password to initiate a new SPA copy on another PC. (However either may initiate a new SPA copy on another PC by answering the authenticating questions if he/she does not know this password.)

Having received this information from the cardholder, the SPA website determines, from the BIN of the presented account number, the address of the SPA authorization system that will process authorization requests for this pseudo BIN. To do this, the SPA website holds an address table that is accessed by pseudo BIN and provides the address(es) of the corresponding SPA authorization system. Having made this determination, the SPA website transmits the information obtained from the cardholder to this SPA authorization system by secure means (e.g., under SSL encryption). It need not retain a copy of this data, as the data will be returned to it from the SPA authorization system.

The method of communication between the SPA website and the SPA authorization system is preferably via the Internet, with perhaps dial-up-telephone backup. In this case the address provided by the address table is the Internet address of the SPA authorization system, and also its telephone number. Another possibility is via a payment network such as MasterCard's Banknet, in which case the "address" is simply the pseudo BIN itself.

Once the SPA authorization system has received the registration request, it confirms that it is the proper facility for the indicated BIN. If not, it rejects the registration request and so informs the SPA website. When the website receives such a response, it sends a message to the web-site operator, and sends to the cardholder's PC a message to "please wait". If the operator is unable to solve the problem in a timely manner (e.g., 5 minutes), the SPA website indicates to the PC that it is unable to provide a SPA wallet for this card at this time.

If and when the SPA authorization system has completed a successful registration, it sends, by secure means, a message to the SPA website that preferably consists of:

1. Cardholder name, address, and telephone number
2. The pseudo account number
3. Card expiration date
4. Last 4 digit of "real" account number
5. Non-reversibly-transformed password
6. Password-encrypted Per-Card Key
7. SPA Copy Number or Single-Session Number
8. SPA Version Number
9. SPA Single-Session Indicator
10. The SPA State
11. The Pseudo-BIN-Key Indicator
12. The card-product name (e.g., "MasterCard", "Maestro", "MasterCard Cash")
13. The "real" account number
14. First-Time-SPA Flag (1=new pseudo account number just determined)

It also returns whatever information the SPA website needs to route the response to the cardholder's PC.

Upon receipt of this message, the SPA website imbeds items 1 through 12 above in a SPA wallet, along with the appropriate software for this SPA version number. Also included in this wallet are initial values of zero for the Mode-1 and Mode-2/3 transaction sequence numbers and for the password-failure counter. The SPA website then transmits this SPA data to the cardholder's PC, where it is stored.

SPA provides a menu of cards that can be used on that PC with SPA. This preferably provides, on one line of the PC screen, the following information about each card:

1. The card's pseudo account number
2. The SPA Copy Number (unless this is a single-session SPA)
3. The last 4 digit of the card's "real" account number
4. The card's expiration date
5. The cardholder's name
6. The card product name (e.g., "MasterCard", "Maestro", "MasterCard-Cash")

Whenever a new SPA wallet is added to SPA in a PC, the new card should be added to this menu list. Cards are listed in the order in which they are registered for SPA, with the first-registered being the first listed. This list is used by the cardholder to select the card for the current transaction. As indicated above, a particular software set is associated with each such card (although two cards with the same version number will use the identical software). Note that, in many cases, a second SPA will never be installed on this PC, and there will be only a single card on this list.

The cardholder may now perform SPA transactions.

SPA Authorization/Clearing Systems

As mentioned briefly above, every card issuer that participates in SPA is served by one "primary" SPA authorization/clearing system, where one such system can, if desired, serve multiple issuers. In a fully-operational SPA system there may be at least one "backup" SPA authorization/clearing system, and this system is used whenever the "primary" system is not available (e.g., due to failure). The use of a "backup" SPA authorization/clearing system allows SPA transactions to be completed, but with (temporarily) degraded security.

Each SPA authorization/clearing system that serves multiple issuers is preferably connected to a payment system such as MasterCard's Banknet via one or more dedicated servers. It receives its authorization-request messages and clearing messages through Banknet, and interfaces with the issuers via Banknet. Such a system preferably operates in a manner that is totally transparent to the issuers it supports.

Single-issuer versions of the SPA authorization/clearing system may also be utilized. One such version interfaces directly to the issuer's processing system. Such a version requires some re-programming on the issuer's part. It must recognize SPA transactions by their pseudo BIN(s), and route such transactions to the SPA authorization/clearing system (e.g., service provider) for conversion from pseudo account numbers to "real" account numbers, and for MAC verification (authorization-request messages only).

Another version of a single-issuer SPA authorization/clearing system might be installed between an issuer's MIP and the issuer's processing system. Such a system can be transparent to the issuer, but all traffic to and from that MIP must pass through this SPA system.

Finally, the authorization functions and the clearing functions for an issuer need not be performed by the same physical box. An issuer can have its authorization-request messages processed by a SPA authorization system that interfaces to the issuer via Banknet, whereas its clearing messages are processed by a single-issuer SPA clearing system that connects directly to the member's processing system.

Initially, there may be relatively few SPA authorization/clearing systems. As more and more issuers, or groups of issuers, elect to have their own SPA authorization/clearing systems, provision must be made to transfer the appropriate data from the original system (serving multiple issuers) to a new system (serving only one, or at least fewer, issuers). Any given pseudo account number is preferably serviced by only one SPA authorization system. Thus, provision should be made so this transfer can occur with minimal disruption to any transactions that are in process at the time of the transfer.

Pseudo Account Numbers

For a "real" payment account number, the associated pseudo account number is preferably 16 digits in length. This 16-digit pseudo account number begins with a 6-digit BIN that is dedicated to such account numbers. It may be unique to a given bank or member of a service provider association, and may also be unique to a given product (e.g., Gold Card, Corporate Card, etc.) within a member.

The two digits (or optionally the one digit) immediately following the BIN may be reserved for a "Control Field", to indicate algorithms, etc., used with this pseudo account number.

The check digit is correct on the pseudo account number, leaving about 7 digits, or optionally 8 digits, thus allowing each such BIN to represent up to 10 million (or 100 million) account numbers for each control-field value.

Since the pseudo-account-number structure enables the issuer to be uniquely identified by BIN, an issuer may: (1) identify "on-us" transactions and (2) identify other issuers with which it has bilateral agreements. As discussed below, issuers that are willing to re-program and to procure appropriate security modules can perform their own message verification, so that "on-us" transactions and transactions with certain other institutions can be performed by these institutions themselves, eliminating the need to send such transactions to the service provider (or MasterCard SPA facility).

Preferably, the right-most seven (or eight) digits excluding the check digit of the pseudo account number are an index that identifies a specific account within the institution identified by the left-most six digits. Initially (if so indicated by the control-field value) this index may be across all institutions. Many such seven-digit (or eight-digit) sets of index values per BIN are available by using different values of the control field. These account-number index values preferably are assigned by the service provider, in this case MasterCard. They may be assigned sequentially (for each institution) or randomly. Alternately, they may be assigned sequentially and then encrypted (into seven or eight decimal digits with random properties) for inclusion in the pseudo account number.

The advantage of assigning the account-number index values randomly, or assigning them sequentially but then encrypting them for inclusion in the pseudo account number, is to make it more difficult for adversaries (e.g., those seeking to perpetrate fraud) to "guess" valid pseudo account numbers. If the account-number index value is sequentially assigned, it would be quite simple for adversaries to "guess" usable pseudo account numbers, namely any pseudo account number less than, or slightly higher than, a pseudo account number assigned to them. By using randomly-assigned, or encrypted account-number index values during the time when relatively few (e.g., <10%) of the possible values for an institution have been assigned, there is only about 1 chance in 10 that the adversaries would be able to "guess" a valid account-number index value. This should make it more difficult for adversaries to find pseudo-account-numbers that could be fraudulently used.

If an issuer wishes to perform its own processing of transactions with pseudo account numbers, it could be given, by a service provider, a list of all of its pseudo account numbers in numeric order, and for each the corresponding "real" account number. If the pseudo account number includes an actual index, the service provider need give the issuer only the "real" account numbers in their indexed order. If the pseudo account number include encrypted account-number index values, the service provider can optionally give the issuer an (issuer-unique) decryption key, and then the "real" account numbers in their indexed order. Presumably, the service provider need not give the issuer the inverse table (as such an issuer would presumably store the pseudo account number for every transaction for which it performed pseudo-to-"real" account-number translation). However, if it were necessary for the issuer to be given the inverse table, such a table would list, in numeric order, every "real" account number for which a pseudo account number had been issued, followed by the corresponding pseudo account number.

In any case the service provider SPA facility must maintain tables that give it the ability to convert from a pseudo account number to a "real" account number, and to convert from a "real" account number to a pseudo account number.

Computation of a Card's Authentication Key

Card-unique authentication keys are based on the cryptographic processing of pseudo account numbers and the corresponding "real" account numbers. A process may be desirable in which intermediate BIN-unique keys are produced, for possible use by national SPA facilities, and by those card issuers that wish to perform their own authentication of SPA transactions. In this way a country-wide facility need be given only one key per pseudo-account-number BIN, and an issuer that performs its own authentication need be given only one key per (for example) 10 million pseudo account numbers. Should a national SPA facility allow its key to be compromised, no other country would be jeopardized. If an issuer allowed its key to be compromised, no other issuer would be jeopardized.

The key-generation process to be used with any given pseudo account number may be indicated by the control field of that pseudo account number. A possible key-generation process to achieve the above-stated objectives is as follows, where a centralized SPA facility alone holds a highly-secret triple-length DEA Key called the "Authentication Key Derivation Key." The preferable steps performed by the security module of the central SPA facility (for instance the MasterCard SPA facility) to create the Per-Card key for a given pseudo account number are as follows:

1. Left-justify the left-most 6 digits of the pseudo account (the BIN), considered as 6 binary-coded-decimal digits of 4 bits each, in a 64-bit field, and pad to the right with zeros. DEA-encrypt these 64 bits using as the encryption key the left-most 8 bytes of the 24-byte Authentication Key Derivation Key.

2. DEA-decrypt the result of Step 1 using as the decryption key the central 8 bytes of the 24-byte Authentication Key Derivation Key.

3. DEA-encrypt the result of Step 2 using as the encryption key the right-most 8 bytes of the 24-byte Authentication Key Derivation Key.

4. Use the result of Step 3 as the left-most 8 bytes of the unique 16-byte Per-BIN Key.

5. Left-justify the left-most 6 digits of the pseudo account number (the BIN), considered as 6 binary-coded-decimal digits of 4 bits each, in a 64-bit field, and pad to the right with binary 1's. DEA-encrypt these 64 bits using as the encryption key the left-most 8 bytes of the 24-byte Authentication Key Derivation Key.

6. DEA-decrypt the result of Step 5 using as the decryption key the central 8 bytes of the 24-byte Authentication Key Derivation Key.

7. DEA-encrypt the result of Step 6 using as the encryption key the right-most 8 bytes of the 24-byte Authentication Key Derivation Key.

8. Use the result of Step 7 as the right-most 8 bytes of the 16-byte unique Per-BIN Key.

9. Encrypt the right-most 16-digit "real" (not pseudo) account number (considered as binary-coded-decimal digits, right-justified and padded to the left with binary zeros if fewer than 16 digits) using as the DEA encryption key the result of Step 4 (the left-most 8 bytes of the Per-BIN Key).

10. Decrypt the result of Step 9 using as the key the result of Step 8 (the right-most 8 bytes of the Per-BIN Key).

11. Encrypt the result of Step 10 using as the DEA key the result of Step 4 (the left-most 8 bytes of the Per-BIN Key).

12. Use the result of Step 11 as the left-most 8 bytes of the Per-Card Key.

13. Exclusive-or the right-most 16-digits of the "real" account number (considered as binary-coded-decimal digits, right-justified and padded to the left with binary zeros if fewer than 16 digits) with the binary pattern 01010101 . . . then encrypt this result using as the DEA key the result of Step 4 (the left-most 8 bytes of the Per-BIN Key).

14. Decrypt the result of Step 13 using as the DEA key the result of Step 8 (the right-most 8 bytes of the Per-BIN Key).

15. Encrypt the result of Step 14 using as the DEA key the result of Step 4 (the left-most 8 bytes of the Per-BIN Key).

16. Use the result of Step 15 as the right-most 8 bytes of the Per-Card Key.

When the central SPA facility creates a SPA for a cardholder's PC, it includes the Per-Card Key (from Steps 12 and 16) in this application in such a way that it will not be disclosed during the normal operation of the application.

Whenever it receives a pseudo account number in a transaction with a message authentication code, the SPA facility determines the "real" account number, then performs the 16 above steps in order to create the key needed to verify the MAC.

If the SPA facility must generate the keys to be held in the security module of a national SPA facility or an issuer, it performs Steps 1 through 8 above for each BIN that is unique to the country, or for that issuer's BIN. These keys are then securely transferred to the security module of the national SPA facility or the issuer, and each such key is associated with the pseudo-account-number BIN (and control field) used to create it. This security module then, for each transaction it receives with a pseudo account number, "real" account number, a MAC, and a specified control field, first selects the key indicated by the pseudo account number's BIN, then uses this key as the Per-BIN Key and performs Steps 9 through 16 above to create the key to verify the MAC.

SPA Initiation

A specific SPA initiation shall now be described with reference to the figures. FIG. 1, for example, illustrates first how a cardholder with a financial transaction card may obtain a secure payment application from the SPA website or service provider 10 over the Internet, according to an exemplary embodiment of the present invention. It should initially be understood that a physical card is not necessary to utilize and obtain the benefits of the invention, but that only an account number be issued to a holder (in this case a cardholder) which identifies and links a user or participant to an account for purposes of conducting a financial transaction. The cardholder may contact a web server associated with the service provider using any appropriate device that may communicate over the Internet, such as a computer, cellular phone, or a personal digital assistant (PDA). For the purpose of simplicity in the following discussions, it is assumed that the cardholder uses a computer to communicate over the Internet.

As shown in FIG. 1, the service provider, for example MasterCard International Incorporated (or an agent of MasterCard), has in its control one or more physically secure security modules 12, which offer physical protection for the information stored inside the modules. These security modules each contain one or more "derivation keys" that are used to create and re-create account-unique secret cryptographic keys (Per-Card keys), as explained below, which are provided within the secure payment application.

First, in accordance with a preferred embodiment of the invention, the cardholder must obtain an SPA from the service provider. The preferable steps for downloading and initializing the secure payment application (SPA) include:

1. The cardholder contacts the service provider's website via the Internet (either directly or through a hyperlink to the website through another website, such as an issuer's website).

2. The cardholder provides, under SSL encryption generally known to those skilled in the art, (a) a payment card account number, (b) a card expiration date, and (c) card authenticating information. The card authenticating information may include, for example, as mentioned above, the card's CVC2 value, which refers to a three or four digit value that is printed next to the signature panel of some cards. This value is generated by the issuing bank using a secret cryptographic key and can be verified using this same key.

3. The service provider may confirm the legitimacy of the card account number and the card expiration date by obtaining a zero amount authorization from the issuer of the cardholder's payment card. For instance, MasterCard may obtain this authorization over its Banknet™ communications network.

4. The service provider may verify the CVC2 value if the issuer of the cardholder's payment card has provided the service provider with the cryptographic key(s) for verifying the CVC2 value.

5. The service provider may verify other card authenticating information by sending such information to the issuer for verification. To facilitate this, the service provider website or, for instance, the MCWS, may maintain a list of items that it will ask consumers when registering for SPA. Examples of such items include:

| Item Number | Item Description |
|---|---|
| 01 | CVC2 |
| 02 | PIN |
| 03 | Mother's maiden name |
| 04 | The amount of last bill on this account |
| 05 | Street address where billed |
| 06 | Last 4 digits of Social Security No. |

Issuers will be able to designate which of this data they want a consumer to provide to the service provider when the consumer registers an account number issued by the issuer with the service provider. The issuers may designate different data items by BIN if the issuers want to handle some BINS (products) differently from others. The service provider website will select the question and prompt the consumer to reply. The results will be provided to the issuer as part of the zero amount authorization request.

6. After the service provider ("SP") has confirmed the legitimacy of the cardholder-provided card data, the SP creates or selects a pseudo account number and a secret key and embeds these data elements into a secure payment software application that is made available to the cardholder for download to his/her PC over the Internet preferably under SSL encryption.

The pseudo account number has as its BIN a special BIN reserved for pseudo account numbers. The remainder of the pseudo account number is a value that can be translated by the service provider via a table look-up process to the "real" account number and its associated expiration date. The check digit is correct on the pseudo account number.

Preferably, the assigned special service provider BIN may be one from a set of many such special BINs, where each BIN may correspond to a particular bank or a particular country or region and/or to a particular product within a country or region.

The secret Per-Card key that the service provider preferably embeds in an SPA is unique for each card account number and is preferably derived within a security module using the card account number and a derivation key. (This process is more fully described below.) The derivation key may itself be derived within the same or another security module using a higher-level derivation key.

The cardholder may provide a password to the service provider prior to downloading the secure payment application or may select a password when the secure payment application is being installed on the cardholder's computer. If a password is provided or selected, the cardholder will thereafter be required to enter this password in order to activate the secure payment application on his or her PC.

As would be recognized by those skilled in the art, the service provider may periodically update the SPA and the SPA may be downloaded as part of a digital wallet application. In addition to the SPA, the digital wallet may store one or more of the following: a cardholder's personal information; a purse application; a debt application; a consumer-to-consumer application; and other applications, all of which are secured under the SPA.

SPA Wallet Operation: Initial Session Activation

SPA in the PC becomes activated when the cardholder clicks on the SPA icon displayed on his/her PC screen. When initially activated (after initial installation, or after having been closed), the first task performed by SPA is to display for the cardholder the total list of SPA cards (cards for which SPA wallets have been obtained) and prompt the cardholder to select the card he/she wishes to use for the current transaction.

Note that multiple cardholders may share a common PC. It is for this reason that the cardholder's name is part of the displayed information about each SPA card, and the reason that each card has its own cardholder-selected SPA password.

Once the cardholder has selected a card from this common list, SPA preferably examines the password-failure counter for this card. If this counter exceeds a SPA-resident threshold, SPA informs the cardholder that this SPA card has had an excessive number of unsuccessful password-entry attempts and must be re-registered. SPA then displays two options, "re-register" or "cancel." If the cardholder selects the former, SPA contacts the SPA website, then suspends itself so that the browser takes over. If the cardholder selects the latter, SPA simply suspends itself.

If SPA determines that the password-failure counter for the selected card has not passed the specified threshold, the cardholder is prompted to enter the password for this card—the password that he/she had selected when SPA was initially obtained for this card. Once the cardholder has completed password entry, SPA non-reversibly-transforms the password and compares it against the SPA-stored value. If an exact match does not occur, SPA increments the password-failure counter for this card (that is saved by SPA and therefore may have a non-zero value when SPA is activated) and prompts for password re-entry. This process is repeated until either the password is correctly entered, or the password-failure counter reaches a predetermined value. In this latter case SPA saves the current value of the password-failure counter and suspends itself after giving the cardholder the "re-register" or "cancel" options discussed above. If the cardholder deactivates SPA without successfully entering the correct password, SPA also saves the current value of the password-failure counter.

If an exact match occurs between the non-reversibly-transformed cardholder-entered password and the value stored within SPA, SPA resets the password-failure counter and preferably uses the just-verified password as a cryptographic key to decrypt the Per-Card Key. SPA then displays the cardholder's address and phone number, and asks, "Has your address or phone number changed?" and provides "Yes" and "No" buttons. Clicking on "Yes" displays a window that allows the cardholder to correct the address and/or phone number.

SPA now examines the expiration date of the just-selected card, to determine if the card has expired (according to the PC's clock) or will expire within the next 30 days. If so, SPA asks the cardholder if he/she has received a new copy of this card, and if so, to please key-enter the new card's expiration date. (The cardholder has the option of saying "no".) SPA is now ready to process a transaction for this just-selected card.

SPA Operation

As discussed, the Secure Payment Application ("SPA") may have different operating modes for payment transactions, including 1. Authentication using only the expiration-date field.
2. Authentication using an additional field.

Mode 2 is used whenever the merchant can accept an additional field in a transaction, referred to in this specification as the "MAC Field." Since it provides a higher degree of authentication than Mode-1, it is used whenever possible. The merchant must indicate to the SPA in the PC that it is Mode-2 compliant by including a MAC Field in the data fields that may be filled in by the PC. (It may be a hidden field, so it is not displayed for the cardholder.) Any such merchant must be able to pass the MAC Field to the acquirer, whenever the PC is SPA-enabled and thus provide the field.

Whenever the PC does not find a MAC Field in the merchant screen, it operates according to Mode 1.

The following discussion describes, by means of examples, how SPA preferably operates in these two modes.

The registration process, by which a cardholder's PC (or other device) obtains SPA, is as described above. The SPA software received by the cardholder's PC supports both operating modes. A different transaction sequence number is used for each mode, one for Mode 1 and another for Mode 2. Both are initialized to "0", and increment separately for each Mode 1 and Mode 2 transaction.

Mode 1: Authentication Using Only the Expiration-Date Field

In Mode 1, the expiration-date field of the authorization request message is used to convey a form of MAC. This "pseudo" expiration date is formatted MMYY as are all expiration dates. Preferably, in order to operate with the current processing systems of most or all merchants in the marketplace today, the pseudo expiration date should fall within the next 48 months.

The Mode-1 transaction sequence number consists of 20 binary bits, incremented for every Mode-1 transaction. Thus, the field will not cycle from all one's to all zeros until $2^{20}$=1 million Mode-1 transactions have occurred. To the left of this field is a four-bit "version number", a number that is unique to each PC in which a SPA for a given account number is resident.

As indicated above, the SPA wallet examines the currently-displayed screen and looks for the "hidden field" where it can place the MAC Field. If it finds such a field, it proceeds for a Mode-2 or Mode-3 transaction, described below.

If it does not find such a field, it looks for fields it can "understand", namely "name", "address", "phone number", "card number", and "card expiration date", using the same language that it used for the previous transaction. Unless it is able to find most of these fields, it asks the cardholder to select the language of the screen. If the language now indicated by the cardholder is different from what SPA had been using, it tries again. If it can identify no or few fields, it asks the cardholder to confirm that a merchant payment screen is really present. (It is possible that the cardholder initiated SPA prematurely.) If the cardholder indicates "no" (there is not a merchant payment screen displayed), SPA suspends itself and turns control back to the previously-running program (presumably the browser).

If the cardholder indicates "yes" (a payment screen is being displayed), or if SPA is able to identify most or all of the merchant payment fields, SPA automatically populates those fields (if any) it is able to identify. SPA then prepares a message to be sent to the SPA website. All communications (in either direction) between the PC and the SPA website should be protected using SSL encryption. This message may consist of the following:

1. The pseudo account number (as 16 decimal digits)
2. The Pseudo-BIN-Key Indicator (8 bits)
3. The SPA State Indicator (1 bit: 0="State A", 1="State B" [There are no Mode-1 transactions for "State C" ])
4. The SPA Version Number (as 15 bits): This field indicates the SPA type (credit, debit, prepaid), and the revision number for this type. For a credit-card SPA, Revision 0, the SPA Version Number is hexadecimal 0000.
5. The Single-Session SPA Indicator (1 bit: 0=normal SPA, 1=single-session SPA)
6. The SPA Copy Number or Single-Session Number (as 10 bits)
7. The last-used Mode-1 transaction sequence number (as 20 bits)
8. The card's expiration date (as 4 binary-coded-decimal digits, or 16 bits)
9. A MAC, preferably of 16 or 32 binary bits, preferably on data elements #3 through #8 (preferably in that order), produced using the Per-Card Key.

The SPA wallet then contacts the SPA website via the Internet, and transmits the above data elements. It then waits for a response (while the SPA website contacts the appropriate SPA authorization system). After a few seconds the SPA wallet displays "Please wait" for the cardholder. Other text is then displayed, describing to the cardholder that SPA is contacting MasterCard to prepare for the desired transactions, and that this may take some time. The display preferably should change every few seconds so the cardholder knows that "something is happening".

If an excessive time has elapsed, the SPA wallet again contacts the SPA website and repeats the request. If it cannot contact the SPA website it normally contacts, it then contacts a backup SPA website. After a predetermined time and number of such trials, if SPA has been unable to obtain a response from the SPA website, it informs the cardholder that it is "unable to complete the transaction at this time" and suspends itself. The cardholder must now try another SPA card, try another payment means (e.g., manually entering a MasterCard account number), or try again later.

The response that SPA will eventually receive from the SPA website will be an "unable to proceed" indication, an "able to proceed" indication, or a "change state" indication.

If the response is an "unable to proceed" indication, SPA also gives a "reason" code. There preferably are three reasons:

1. This SPA copy number is no longer valid (because a more-recent SPA copy has the same last "n" bits). (A limited number of SPA copies, for example 16, for the same pseudo account number can be in concurrent use)

2. This is a single-session SPA that has expired

3. The MAC did not verify or the transaction sequence number is not valid or the "Invalid Until" Indicator holds a future date or the "Invalid Copy" flag is set If the "unable to proceed" indication is for the first reason, the cardholder is preferably informed:

You must re-register this card for this PC by contacting MC-Internet.com. Since you originally registered this card on this PC, you have registered this same card on other PCs a total of at least 16 [or another number of] times, and this has caused your original registration on this PC to be invalidated.

If the "unable to proceed" indication is for the second reason, the cardholder is informed:

This card on this PC was usable for only 4 hours [or another time]. This time is now expired. To continue you must re-register this card for this PC by contacting MC-Internet.com.

In both of the above situations, the cardholder is offered two buttons, one called "Re-register" and the other called "Cancel". Activating the first causes SPA in the PC to contact the SPA website, and then suspend itself. Activating the second causes SPA in the PC to immediately suspend itself.

If the "unable to proceed" indication is for the third reason, the attempt is considered fraudulent and the cardholder is informed:

Unable to proceed. Please contact your issuer.

After displaying this message, SPA suspends itself.

If the response is a "change state" indication, the identity of the new state is included with the response. SPA in the PC then changes the state it stores for this pseudo account number to this new state. It then re-processes the transaction according to the rules of this new state. This may, or may not, cause another Mode-1 initiation to occur.

If the response indicates "able to proceed", this response is accompanied by the following data (not displayed for the cardholder):

1. Reference Date, described below (2 bytes, formatted YYMM as binary-coded-decimal)

2. Number-of-Months Indicator, described below (2 bytes, as a four-digit binary-coded-decimal number)

SPA then preferably proceeds as follows:

1. Increments the Mode-1 Transaction Sequence Number

2. Uses this Transaction Sequence Number and the Per-Card Key to create a 64-bit binary MAC.

3. Converts this 64-bit binary MAC into a pseudo expiration date using the Reference Date and the Number-of-Months Indicator as just received from the SPA website.

4. Places this pseudo expiration date into the "expiration date" field in the merchant's payment screen if SPA is able to locate this field.

5. Places the pseudo account number into the "account number" field in the merchant's payment screen if SPA is able to locate this field.

6. If there are any items in the merchant's payment screen that SPA has not been able to locate and populate, then displays a "drag and drop" menu that lists the (remaining) items that have not yet been populated.

7. Displays a message to the cardholder that the basic data for the merchant has been provided, and then suspends itself. (There may be some data, such as the cardholder customer-number with this merchant, that SPA does not know and that must be manually entered by the cardholder. He/she then causes the PC's browser to transmit this fill-in screen to the merchant.)

The data in the "drag and drop" menu includes any of the following items that SPA has not been able to place in the merchant's payment screen:

1. Cardholder's name, displayed as the actual name ("John R. Jones")

2. Cardholder's address, displayed as the actual address ("111 First Street, Ely. Nev. 99999")

3. Cardholder's phone number, displayed as the actual number ("650-111-2222")

4. Card account number, displayed as the words "Card Account Number" (since the cardholder may not yet know or recognize his/her pseudo account number)

5. Card expiration date, displayed as the words "Card Expiration Date" (since it is a pseudo expiration date and would be meaningless to the cardholder)

There is also a "Cancel" button, in the event that the screen does not require all of these items. If the "Cancel" button is hit before the pseudo account number and the pseudo expiration date have been placed on the merchant's payment screen, a message is preferably displayed for the cardholder that indicates:

Are you sure you want to cancel? Canceling now will not allow payment to occur.", followed by "Yes, Cancel" and "No, Continue" buttons.

If the "Yes" button is selected, SPA is suspended and control returns to the browser (or whatever program had been previously running). If "No" is selected, the "Cancel" window goes away and SPA continues with the "drag and drop" procedure.

If SPA is successfully completed, and thus suspends itself, control returns to the browser, and it is presumed that the cardholder will use the browser to transmit, to the merchant, the now-filled-in merchant's payment screen. There is no need for SPA to again be activated until the cardholder is ready to make another purchase.

Specific Processing of a Mode-1 SPA Request

Mode-1 SPA is preferably initiated during every transaction, immediately before the SPA-based payment is to be performed. As illustrated in FIG. 2, SPA passes to a website or server (preferably MasterCard's as the service provider) a request consisting (for example) of the 16-digit pseudo account number, the four-decimal-digit expiration date of the real account number, the four-bit SPA version number, the current value of its 20-bit Mode-1 transaction sequence number ("TSN"), and a 16-bit MAC based on these latter three values. The MAC preferably is created by triple-DEA encrypting, using the SPA-resident 16-byte Per-Card key, the 16-bit expiration date (as binary-coded-decimal) concatenated (left-to-right) with the four-bit SPA version number concatenated with the 20-bit Mode-1 transaction sequence number, left justified in a 64-bit field and padded to the right with binary ones, then selecting the 16 left-most bits of the resulting cipher-text.

Figure 3:
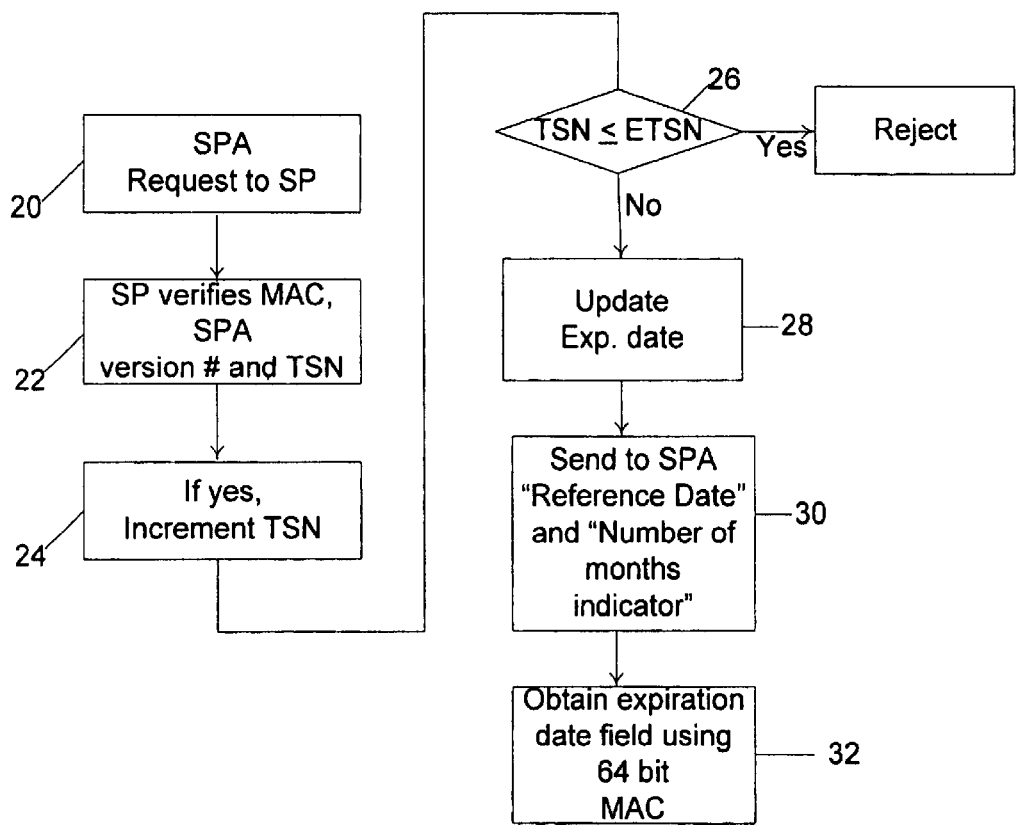
FIG. 3 is a flow diagram illustrating the steps taken to obtain an expiration date field value, in accordance with one embodiment of the present invention.

FIG. 3 depicts the sequence of steps involved in the SPA initiation and transaction payment preparation in Mode 1. As discussed, the SPA first in step 20 passes an initiation request to the service provider. When the MasterCard website receives this information, in step 22 it uses a special security-module-equipped SPA system to verify the MAC preferably based on the expiration date, SPA version number and the transaction sequence number. If the MAC verifies, this system in step 24 increments the transaction sequence number to create the "expected transaction sequence number" and causes an update of the "expected transaction sequence number" for the pseudo account number and SPA version number in question in the SPA authorization system that processes SPA authorization requests for the BIN of the indicated pseudo account number. However, in step 26, this SPA authorization system will reject the just-received "expected transaction sequence number" if it is less than or equal to the highest-numbered "expected transaction sequence number" previously received for this pseudo account number and SPA version number. This SPA authorization system in step 28 is also given the just-received expiration date, and updates the expiration date associated with this pseudo account number if it is later than the expiration date currently on record.

This special SPA system sends to the MasterCard website, which in turn sends in step 30 to the SPA in the cardholder's PC, the following two reference data values: 1) a data value referred to as the "reference date", which is a four-digit decimal number with the format MMYY (and which is, in effect, this month's or next month's date), and 2) a data value referred to as the "number of months indicator", which is an eight-bit binary number with a maximum value less than (decimal) 256. This data is also included in the information that is sent to the appropriate SPA authorization system.

Generation of Pseudo Expiration Date

For each actual Mode-1 transaction, the Mode-1 transaction sequence number is first incremented. The resulting 20-bit number, with the four-bit SPA version number concatenated to the left, is then (for example) left-justified in an 8-byte field, padded to the right with binary zeros, and triple-DEA encrypted using the double-length SPA Per-Card key. The result is the 64-bit binary MAC.

The pseudo expiration date field of the transaction may then be obtained, in step 32, from this 64-bit binary MAC as follows:

1. Select the left-most "one" bit in the "number of months indicator" (a binary number) and count the number of bit positions from this bit position to the right-most bit (including the bit position of the left-most "one" bit). Call this number "N." For example, if the "number of months indicator" is 01010100 (decimal 84)the value "N" is seven. Having determined "N", consider the 64-bit binary MAC, as groups of "N" bits each, ignoring any left-over right-most bits. Starting with the left-most group, select the first group encountered that is less than or equal to the "number of months indicator." If no such group is found, select the left-most group, from this group subtract $2^n$, and use this result (which will be >0 and <"number of months indicator") as the selected value.

2. Divide the result of Step 1 by binary 1100 (decimal 12) producing a quotient and a remainder. Convert both the quotient and the remainder into decimal numbers. Add the remainder, as a decimal number (having a value in the range 00 to 11) to the two left-most decimal digits (MM) of the "reference date." If the result is greater than 12, subtract 12 from the result and in either case use the result as the two left-most digits, MM, of the pseudo expiration date for the current transaction. If obtaining the result required a subtraction of 12, increment (by one) the quotient.

3. Add, mod-100, the two-decimal digit quotient from Step 2, possibly incremented as also indicated in Step 2, to the right-most two digits (YY) of the "reference date." Use the result as the two right-most digits, YY, of the pseudo expiration date for the current transaction.

Communication between Cardholder and Merchant

Once the SPA has been installed on a cardholder's computer, the cardholder preferably uses the SPA for all Internet payments and the SPA provides the cardholder's pseudo account number for all Internet transactions. In SPA Mode 1, the fact that this is a SPA transaction is transparent to the merchant. Although the account number is actually a pseudo account number, and the expiration date is actually a representation of a MAC, the merchant is unaware that this transaction is different from any other Internet SSL transaction it receives.

Acquirer Handling of Authorization Request

Figure 4:
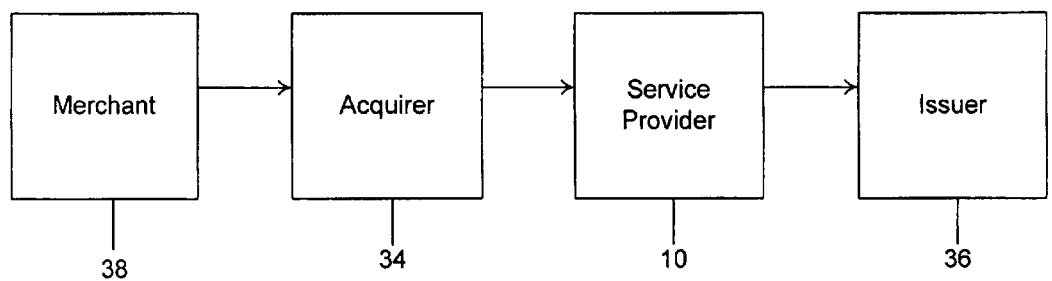
FIG. 4 is a flow diagram illustrating the flow of communication among a merchant, an acquirer, a service provider and issuer, in accordance with one embodiment of the present invention.

FIG. 4 illustrates the communication between an acquirer 34, a service provider (MasterCard) 20, an issuer 36, and merchant 38, according to an exemplary embodiment of the present invention.

When an acquirer 34 receives an authorization request message from an Internet merchant 38, it looks up the issuer BIN in its BIN table. In the case of a pseudo account number transaction, the "issuer" will correspond to a service provider or MasterCard-authorized processing facility.

In one embodiment of the present invention, some countries may have a special security-module-equipped facility that handles domestic transactions. Each such facility would be set up only with the central service provider's approval and would hold only the cryptographic keys and account-number conversion data for the country whose transactions it processes. In countries with such a national SPA facility, all transactions will be sent to this facility, so that same-country transactions need not leave that country. This can also be done for individual banks in a country, if it is so desired.

A national SPA facility to handle domestic transactions may be more efficient than causing all transactions to go through a central processing facility.

Service Provider Handling of the Authorization Request

First, it is determined from the issuer BIN whether the account number is really a pseudo account number and, if so, the transaction is sent to a special system for processing. This system stores the tables necessary to convert from a pseudo account number to the corresponding "real" account number. It also stores, for each SPA version number and pseudo account number, a record of the 20-bit highest-numbered "expected transaction sequence number"

received, along with an indication of whether or not the MAC has been verified for this transaction sequence number. In addition, it stores any "expected transaction sequence numbers" received within the past 48 hours for which the MAC has not yet been verified. Associated with each such expected transaction sequence number, the system also stores an indication of the "reference date" and the "number of months indicator" that apply to each expected transaction sequence number.

The "reference date" is a date value indicating the earliest expiration date that is acceptable in an authorization request message. By way of background, some merchants do not request authorizations immediately, but batch authorization requests together. Therefore this date is typically one or two days ahead of the date when the transaction is initiated.

The "number of months indicator" indicates the number of months beyond the current date corresponding to the latest expiration date for which a payment card will be accepted. Typically, this number is 48 months.

This system also has a security module with the capability to determine the unique, secret 16-byte cryptographic key placed in the SPA of the cardholder's PC when registration occurred. The processing performed by this system is then as follows:

1. From the pseudo account number determine the "real" account number using the stored conversion tables described above.

2. Using the security module, determine the cryptographic key unique to this SPA using the pseudo account number and the "real" account number (as described previously).

3. Select the 20-bit "expected transaction sequence number" that was received first within the past 48 hours for which a MAC has not yet been verified. Compute the 64-bit MAC on this 20-bit transaction sequence number and its associated SPA version number, as defined above for SPA at the PC. Using the "reference date" and "number of months indicator" specified for the associated "expected transaction sequence number", determine from this MAC an expiration date using the methodology defined above for SPA at the PC. If this expiration date equals the expiration date of the current transaction, the MAC has verified. The entry for this "expected transaction sequence number" that resulted in the MAC verification is then marked as "MAC verified" if it is the highest-numbered "expected transaction sequence number" for its associated SPA version number, or deleted if it is not the highest-numbered "expected transaction sequence number" for its associated SPA version number. The entry for any lower-numbered "expected transaction sequence number" that is marked as "MAC verified" and is associated with the same SPA version number is now deleted.

4. If the MAC is verified in Step 3 (or Step 5), make an entry in "History Data" for this pseudo account number unless it is known that the merchant of this transaction will never send a second authorization-request message for this same transaction. (Some merchants may send a second, or more, authorization-request message for the same transaction if they cannot ship all of the merchandise within a specified time after the transaction.) This History-Data entry includes all of the data discussed above plus the identity of the merchant and the acquirer, and an "expiration date" for this entry. This entry expiration date is a specified time (e.g., 6 months) in the future.

5. If the MAC did not verify in Step 3, then repeat the procedures defined in Step 3 for all other "expected transaction sequence numbers" that were received during the past 48 hours from the oldest to the newest that are not associated with already-verified MACS. Again, if, for any of these trials, the resulting date matches that in the current transaction, the MAC is considered to have been verified. If the MAC verifies, the 20-digit "expected transaction sequence number" that resulted in the MAC verification is then marked as "MAC verified" if it is the highest "expected transaction sequence number" for the associated SPA version number in question, or deleted if it is not the highest "expected transaction sequence number" for the associated SPA version number in question. If the MAC is verified in this step, also perform Step 4.

6. If the MAC does not verify in either Step 3 or Step 5, the "History Data" for the pseudo account number in question is accessed. If there is an entry in this data for the same merchant and acquirer that produces the same expiration-date MAC, and this entry has not expired, then accept the MAC. (This is presumed to be an additional authorization-request message for an already-authorized transaction.) If the MAC is accepted because of this entry, the entry expiration date should be made about 2 months in the future if it is less than that, because this may be a "recurring payment" and there may be another authorization-request message for this same transaction in about another month.

7. If the MAC does not verify in Step 3, Step 5, or Step 6, the transaction must be rejected. In this case a "decline" response is sent to the acquirer.

If the MAC is verified, MasterCard formats an authorization request message for the issuer. The authorization request message includes the "real" account number (rather than the pseudo account number) and the "real" expiration date (rather than the MAC). However, the MasterCard SPA authorization system must retain a record of the account-number field and the expiration-date field as received from the acquirer in anticipation of receiving the authorization response from the issuer.

If an authorization response is routed through the payment network based on an acquirer BIN, in the authorization response message sent to the issuer, MasterCard may replace the acquirer BIN in the transaction message with one of the MasterCard special BINS that serves as a "pseudo" acquirer BIN. The acquirer BIN is replaced so that the issuer responds to MasterCard instead of to the acquirer. It is not necessary to perform this step if the payment network keeps a record of where the authorization-request message comes from and sends the authorization-response message back to that same place.

If a pseudo acquirer BIN is used, in order for the acquirer and issuer to compute interchange fees correctly, the pseudo acquirer BIN should correspond to the country in which the acquirer is located or to another country or region that will provide the same resultant interchange fees. If each country has a special BIN associated with it, MasterCard may replace the acquirer BIN with the special BIN associated with the acquirer's country. If an acquirer's country does not have a special BIN associated with it, a special BIN associated with another country may be selected that results in the same interchange fees.

If a pseudo acquirer BIN is used, MasterCard stores in a database the acquirer reference data received in the authorization request from the acquirer (hereinafter referred to as the "original Acquirer Reference Data"). In formatting an authorization message for the issuer, MasterCard replaces the original Acquirer Reference Data with "pseudo" acquirer reference data that includes the pseudo acquirer BIN, an appropriate transaction-type indicator, and an index value that MasterCard can use to find the original Acquirer Reference Data.

When a national SPA facility processes a pseudo-account-number transaction, it operates as described. However this national SPA facility will process only transactions for domestic issuers, and therefore will need only the cryptographic keys and account-number conversion table entries that apply to that country.

It may be more efficient for the SPA authorization system to compute and store the MAC-representing expiration date when it receives a new "expected transaction sequence number" rather than wait until an actual authorization request is received. Then, when an authorization request is received, it need only compare the expiration date in the authorization request message with those it had pre-computed and stored within the past 48 hours that have not yet matched the expiration date in any previous authorization-request message.

Issuer Handling of Authorization Request

Figure 5:
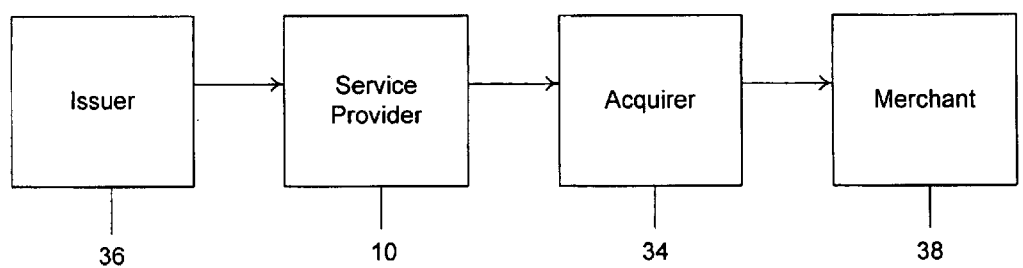
FIG. 5 is a flow diagram illustrating the flow of information among an issuer, a service provider, an acquirer and merchant, in accordance with one embodiment of the present invention.

FIG. 5 illustrates the communication between an issuer 36, MasterCard (service provider) 10, an acquirer 34, and merchant 38 according to an exemplary embodiment of the present invention after the issuer has received an authorization request from, for example, MasterCard or from an authorized national SPA facility.

The issuer authorizes the transaction just as it would any other transaction. The authorization response back is routed back to the "pseudo" acquirer, namely the same MasterCard SPA authorization system that translated the pseudo account number to the "real" account number and verified the MAC-representing expiration date.

As indicated above, this system maintained a (temporary) record of the transaction, and is thus able to restore the account-number and expiration-date fields to their values as received from the acquirer. The authorization response, with these fields replaced with the values received from the acquirer, is then sent to the acquirer, and in turn sent from acquirer to merchant, just as for a normal MasterCard transaction.

If the SPA authorization system is actually a national SPA facility, this facility performs the functions indicated in the preceding description.

Clearing and Settlement

The acquirer places the transaction into clearing in the normal way. It goes to the MasterCard INET (clearing and settlement) system, which converts the pseudo account number to the "real" account number. (There is no expiration-date field in such a clearing message.)

Once INET has converted the transaction to the "real" account number, it is sent to the issuer, and is cleared and settled as any other transaction.

Exception Processing

If there is a future chargeback, request-for-copy, or any other exception processing concerning this transaction initiated by the issuer, it must be routed to INET (or to a SPA exception-processing system), where a translation occurs from the "real" account number to the pseudo account number. This translation can be based on tables, it being unnecessary for this facility to retain a record of each individual transaction. Data in the transaction causes it to be so routed from the issuer to the appropriate MasterCard facility.

Any response, from the merchant and the acquirer to the issuer, is similarly routed to the appropriate MasterCard facility, where the "real" account number is associated with the response.

Alternate Embodiment for Mode 1

Figure 6:
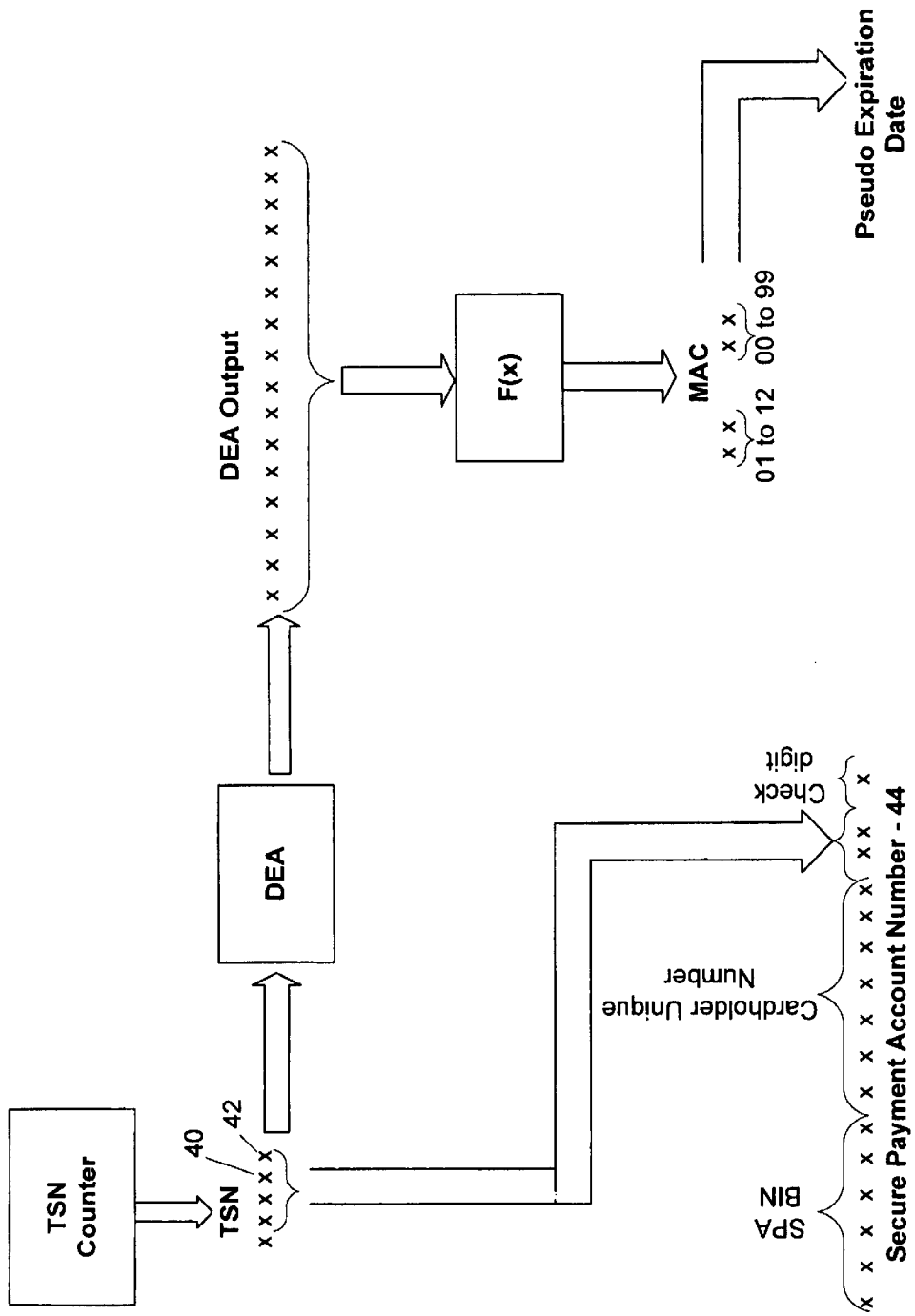
FIG. 6 is an illustration representing an alternate method of sending a message in accordance with one embodiment of the present invention.

FIG. 6 illustrates an alternate embodiment for Mode 1. Each "X" in FIG. 6 represents a digit. In this embodiment, the MAC is generated based on the transaction sequence number and becomes a pseudo expiration date as described above. In addition, one or more lower-order digits (indicated by 40, 42) of the transaction sequence number used to generate the MAC are placed in the pseudo account number 44. These digits may be placed between the cardholder number and the check digit as shown in the figure.

In this embodiment, the SPA is not required to communicate with a MasterCard website or server during a transaction. A SPA facility would then maintain a transaction sequence number counter for each registered SPA. When a SPA facility receives an authorization request, it would generate the MAC based on the high-order digits of the transaction sequence number counter it maintains along with the lower-order digits of the transaction sequence number in the pseudo account number. It would then convert this MAC into a pseudo expiration date, and compare this expiration date with the expiration date in the authorization-request message. It would also verify that the transaction sequence number was not the repeat of the number from a previous transaction.

Modes 2 and 3: Authentication Using an Additional Field

The SPA wallet should not have been activated (if the cardholder properly followed directions) until the merchant's payment screen is displayed on the PC. Thus when SPA is ready to process a transaction, it examines the currently-displayed screen and attempts to "make sense" out of what it sees. It first looks for a "hidden" field that is the SPA MAC Field.

For a Mode-2 transaction, the identifier of this field must be a specified value. For a Mode-3 transaction, the identifier of this field is a different value. If SPA finds two hidden fields, one with the Mode-2 identifier and the other with the Mode-3 identifier, SPA always selects the Mode-2 field and considers this to be a Mode-2 transaction.

If SPA is able to find this "hidden" field, this will be a "Mode-2" or a Mode-3 transaction. In the case of such a transaction, SPA can also find the "card number" field, the "expiration-date" field, and the fields specifying the cardholder's name, address, and telephone number, as all of these fields, in the case of a SPA-compliant merchant, are identified in a standardized way. In this case, SPA can populate the entire payment screen.

In the event of a Mode-2 or Mode-3 transaction, SPA proceeds as follows:

1. Populate the merchant payment screen's entries for cardholder's name, cardholder's address, cardholder's telephone number.
2. Populate the "account number" field of the merchant's payment screen with the pseudo account number.
3. Populate the "expiration-date" field of the merchant's payment screen with the expiration date as stored in SPA for this card (which the cardholder may have manually updated).
4. Increment (and permanently store) the Mode-2 transaction sequence number.
5. Create a MAC.
6. Create a MAC field (including the above-generated MAC) as defined below.
7. Place the MAC Field in the "hidden" field of the merchant's payment screen.

8. Inform the cardholder that the merchant's payment screen has been populated and can now be sent.

9. Suspend itself, so that control is turned back to the PC's browser.

The cardholder is now expected to use the conventional browser functions to send the screen that SPA has now populated, just as if the cardholder had manually populated appropriate fields him/herself.

The Mode-2/3 MAC field preferably consists of the following data elements:

1. The Pseudo-BIN-Key Indicator (as 8 bits).
2. The SPA Mode Indicator (as 1 bit: 0=Mode-2, 1=Mode-3).
3. The SPA Version Number (as 15 bits): This field indicate the SPA type (credit, debit, prepaid), and the revision number for this type. For a credit-card SPA, Revision 0, the SPA Version Number is all zeros.
4. The Single-Session SPA Indicator (1 bit: 0=a normal SPA, 1=a single-session SPA).
5. The SPA Copy Number or Single-Session Number (as 10 bits).
6. The just-incremented Mode-2/3 transaction sequence number (as 20 bits).
7. The card's expiration date (as 4 binary-coded-decimal digits, or 16 bits).
8. A MAC, of 32 binary bits, on data elements #2, through #7, in this order, produced using the Per-Card Key.

Mode-2 and Mode-3 use the same set of transaction sequence numbers. Thus there will never, from the same cardholder's SPA on the same PC for the same pseudo account number, be a Mode-2 transaction with the same transaction sequence number as a Mode-3 transaction.

The next time that SPA is re-activated (un-suspended), it will again display the list of all SPA cards and ask the cardholder to select one. However if SPA has been suspended but not closed, and if the cardholder selects the card that was just used, SPA does not (again) ask the cardholder if the address, phone number, or card expiration date have changed. In addition, SPA does not require that the password be re-entered. Rather, SPA has retained the cleartext Per-Card Key (which is otherwise encrypted using the password as a key). This cleartext key is erased either when SPA is closed or when another card is selected.

Specific Processing of a Mode 2 Request

In this mode, a separate MAC field, of (for example) 13 decimal digits, is included in the transaction as a SPA-unique field. These 13 digits might be as follows:

1. A "SPA indicator" field, one decimal digit: This field normally contains the value "1 ". However if the cardholder has more than one copy of SPA for the same "real" account number, (e.g., on a desktop computer and on a laptop computer), additional versions of SPA will have different numbers in the SPA indicator field. (The SPA transaction sequence numbers are unique to each such version of SPA.)
2. The SPA transaction sequence number for this version of SPA, 6 decimal digits: This field increments for each SPA transaction initiated at this particular computer. (Each computer has its own version of SPA, and thus will have its own set of sequence numbers.)
3. The MAC itself, 6 decimal digits: The actual MAC, computed on the two above fields, as described below.

A suggested MAC-generation process is as follows:

1. Represent the 7 digits of the SPA version number (to the left) and the SPA transaction sequence number (for this computer) as binary-coded-decimal, thus producing 28 bits. Left justify these 28 bits in a 64-bit field, and pad to the right with zero bits.
2. DEA-encrypt the result of Step 1 using as the encryption key the left-most 8 bytes of the Per-Card Key
3. DEA-Decrypt the result of Step 2 using as the decryption key the right-most 8 bytes of the Per-Card Key.
4. DEA-encrypt the result of Step 3 using as the encryption key the left-most 8 bytes of the Per-Card Key.
5. Consider the 64-bit result of Step 4 as 16 hexadecimal digits of 4 bits each. Scan (from left-to right) these 16 hexadecimal digits, selecting the first 6 such digits with value less than or equal to hexadecimal "9". If 6 such digits are not found, find the remaining required digits by re-scanning the digits, this time selecting only digits greater than hexadecimal "9", and subtracting hexadecimal "A" from each.
6. Use the result of Step 5 as the 6-decimal-digit MAC for this transaction.

The MAC is produced by the SPA in the cardholder's PC, and is to be verified in the appropriate MasterCard SPA facility. When produced, the 6 decimal digits resulting from Step 6 are inserted into the MAC Field as the actual MAC. When verified, SPA facility performs the above 6 steps using the left-most 7 digits of the MAC field, then compares the 6-digit result from Step 6 against the right-most 6 digits of the received MAC field. An exact match indicates an authenticated transaction. A non-match indicates a transaction that must be rejected.

Communication Between Cardholder and Merchant

Whenever the MAC field is supported by the merchant, the SPA uses its embedded, secret key to create a MAC relating to the transaction, and places this MAC, and the data on which it is based, in a MAC field, which becomes a portion of the transaction.

Upon receipt of the cardholder's transaction message, the merchant formats a conventional authorization request for the acquirer. This authorization request contains the MAC field as provided by the consumer's PC.

Should a merchant initiate multiple authorization/clearing transactions for a cardholder transaction, only the first of these transactions includes the MAC field and the expiration date. The subsequent transactions include only the pseudo account number and may be considered as merchant-originated mail-order-telephone-order transactions. This is also true for all recurring payments and partial payments with multiple clearings.

Service Provider Handling of Authorization Request

When the service provider receives a transaction, it determines from the issuer BIN whether the account number is really a pseudo account number and, if so, sends the transaction to a special SPA authorization system for processing. This system may be a national SPA facility, as discussed above. This system automatically notes, from the presence of the MAC field, that it is a Mode-2 transaction. After translating the account number from a pseudo account number to the corresponding "real" account number, the system determines the Per-Card Key (as described above), and uses this key to verify the MAC, using essentially the same procedure used in the PC to create the MAC. The system also checks the transaction sequence number, and to do so must maintain transaction-sequence-number information for every version number of every pseudo account number that it processes. It rejects a transaction if:

1. The transaction sequence number is smaller than (or equal to) the largest transaction sequence number for this version of this SPA received at least 48 hours ago, or 2. The transaction sequence number matches any already-received transaction sequence number for this version of this SPA. (This may be limited to the transaction sequence numbers received within the past 48 hours.

If the MAC or the transaction sequence number fails to verify, this facility causes the transaction to be declined. If both the MAC and the transaction sequence number verify, this facility causes the transaction, with the "real" account number (and the "real" expiration date, which was inserted into the transaction by the cardholder's PC) to be routed to the issuer.

Issuer Handling of Authorization Request

The issuer authorizes the transaction just as it would any other transaction. The authorization response is routed back to the same SPA authorization system that translated the pseudo account number to the "real" account number and verified the MAC. If the payment network through which the authorization response is routed is based on an acquirer BIN in the response message, a pseudo acquirer BIN may be used as described above.

This system translates the "real" account number back to the pseudo account number, and restores the data that had been in the original transaction. (In the case of Mode 2, the expiration date carried in the transaction from its inception is the "real" expiration date, so this field need not be restored.) The resulting message is then transmitted to the "real" acquirer, which processes the transaction normally and sends the authorization response to the merchant in the normal way. The merchant responds to the authorization response as it would for any other transaction.

If the transaction is routed to a national SPA facility, this facility performs the functions indicated in the preceding description.

Clearing and Settlement

A SPA clearing message is sent to the MasterCard INET (clearing and settlement) system just as are all clearing messages. Since a SPA transaction includes a recognizable BIN, INET replaces the pseudo account number with the "real" account number. Other changes are made to the message so that, should there subsequently be any exception processing for this transaction, the exception-processing message will be routed to a SPA facility that can translate the "real" account number to the pseudo account number. The clearing message with these changes is transmitted to the card issuer, which processes the transaction in the normal way. If the acquirer happens to also be the issuer, MasterCard returns the cleared transaction to the acquirer/issuer with the indicated changes and with proper fee calculations.

Exception Processing

When a message about a transaction must be transmitted back to the acquirer or merchant from an issuer, the message is processed by the issuer as it normally would process any transaction message. Data in the transaction record causes the message to be routed to a MasterCard facility that in turn causes the "real" account number to be translated back to the pseudo account number. The exception-processing message is then routed to the acquirer, which processes it like any other such message.

Additionally, any documentation about a transaction that is transmitted between acquirer and issuer is changed by MCI so that the acquirer will receive the pseudo account number and the issuer will receive the "real" account number. Where such data is electronic and identifiable, it is internally changed. Where such documentation is not totally electronic, an additional form may be created that reflects both the real and pseudo account numbers. Issuers, sending such documentation to acquirers directly, may be required to provide both numbers.

Issuance of Plastic Cards for Identification

In some situations, a cardholder may buy a ticket over the Internet and will be required, upon showing up at the event to which the ticket grants admission, to produce the card used in the transaction in order to authenticate rightful possession of the ticket.

At the beginning of the SPA program, the cardholder may be issued actual plastic cards that show the pseudo account number, such a card clearly indicating that it is for "identification purposes only."

Subsequently, those merchants that have a legitimate need to authenticate a cardholder using a pseudo account number may register with MasterCard (by providing to MasterCard appropriate identification and authentication information), and the merchants will be provided with a secret key or certificate as cryptographic proof of their registration. Thereafter, such merchants may obtain "real" account numbers from a MasterCard facility by providing a copy of the pseudo-account-number transaction details under cryptographic authentication that authenticates both the transaction data and the merchants' right to obtain a "real" account number. MasterCard may then forward the "real" account numbers in encrypted form to the merchants, so that the cardholders may be identified with the cards corresponding to their "real" account numbers.

SPA Wallet Operation: Mode-0 Transaction Processing

Mode-0 is used only with the wallet for the pseudo account number in "State C". It is used under the conditions that Mode-1 would be used in "State A" or "State B" (SPA could not find the identifier for a "hidden" field usable as the SPA MAC Field). When operating in Mode-0, SPA in the PC simply places the pseudo account number in the "account number" field of the merchant's payment screen, and the actual expiration date in the "expiration date" field of this screen. It fills in the other blanks in the merchant's payment screen as described for Mode-1.

Although preferred embodiments of the invention have been disclosed for illustrative purposes, those skilled in the art will appreciate that many additions, modifications, and substitutions are possible without departing from the true scope or spirit of the invention as defined in the accompanying claims.

We claim:

1. A method of conducting an electronic transaction over a public communications network with an account number, comprising:

electronically generating a per-card key associated with said account number;

electronically generating a message authentication code using said per-card key;

electronically converting said message authentication code into a pseudo expiration date;

electronically generating an authorization request for said transaction, said request having an expiration date field containing said pseudo expiration date; and electronically verifying said message authentication code based on said pseudo expiration date.

2. The method of claim 1 wherein said electronic transaction is conducted over a public communications network and a payment network including an issuer of said account number, and wherein said account number has a real expiration date, further comprising the steps of generating a second authorization request including said real expiration date and forwarding said second request to said issuer for approval of said transaction.

3. A method of conducting an electronic transaction over a public communications network with a payment account number having an associated pseudo account number, comprising:

(a) electronically generating by a service provider a per-card key associated with said pseudo account number using said payment account number and said pseudo account number;

(b) creating a secure payment application for use in said transaction including said per-card key, (c) using said per-card key to electronically generate a message authentication code ("MAC");

(d) electronically generating a MAC verification request by said secure payment application including said pseudo account number and said MAC;

(e) electronically verifying said MAC;

(f) based on said verification, creating an expected transaction sequence number (ETSN) for said MAC;

(g) providing said secure payment application with reference data;

(h) electronically creating a second message authentication code using said expected transaction sequence number and said per-card key;

(i) electronically converting said second message authentication code into a pseudo expiration date using said reference data;

(j) electronically generating an authorization request having an expiration date field containing said pseudo expiration date; and (k) responding to said authorization request and verifying said second message authentication code based on said pseudo expiration date.

4. The method of claim 3 wherein said per-card key is generated using a per BIN key.

5. The method of claim 3 wherein said MAC verification request further includes an expiration date of said payment account number, a version number and a transaction sequence number value, and wherein said step of verifying said MAC is based on said expiration date, said version number and said transaction sequence number value.

6. The method of claim 5 wherein said step of creating said second message authentication code uses said version number.

7. The method of claim 3 wherein said reference data includes a reference date and a number of months indicator.

8. The method of claim 3 wherein said step of verifying said second message authentication code includes the following steps:

determining said payment account number using said pseudo account number and a stored conversion table;

determining said per-card key associated with said pseudo account number using said payment account number and said pseudo account number;

selecting a second expected transaction sequence number for which an associated message authentication code has not been verified;

converting said third message authentication code into a second pseudo expiration date using second reference data, said second reference data being specified for said second expected transaction sequence number;

comparing said second pseudo expiration date with said pseudo expiration date; and verifying said second message authentication code based on said comparison.

9. The method of claim 8 wherein said second message authentication code is verified if said second pseudo expiration date matches said pseudo expiration date.

10. A method of conducting an electronic transaction over a public communications network, with a payment account number having an associated pseudo account number, comprising:

(a) electronically providing said pseudo account number with a control field indicating one of a plurality of key-generation processes to be used to generate an authentication key;

(b) electronically generating an authentication key associated with said pseudo account number using said one of said plurality of key-generation processes indicated in said control field of said pseudo account number;

(c) using said authentication key to electronically generate a message authentication code specific to said transaction;

(d) electronically generating an authorization request message including said message authentication code and said pseudo account number; and (e) verifying the message authentication code using said indicated key-generation process and said authentication key.

11. The method of claim 10 wherein said authentication key is generated also using an authentication key derivation key on said pseudo account number.

12. The method of claim 11 wherein said authentication key is generated also using a per-BIN key.

13. A method of conducting an electronic transaction over a communications network with an account number, comprising:

electronically generating a per-card key associated with said account number;

electronically generating a message authentication code using said per-card key;

providing at least two different operating modes for forwarding in different manners said message authentication code with an authorization request having different fields, at least one of said operating modes for forwarding said message authentication code in an expiration date field and at least one of said operating modes for forwarding said message authentication code in a message authentication code field.

14. The method of claim 13, wherein said message authentication code is automatically conveyed in said message authentication code field if said message authentication code field exists.

* * * * *